(12) United States Patent
McGowan et al.

(10) Patent No.: US 11,710,151 B2
(45) Date of Patent: Jul. 25, 2023

(54) LIVE AD PROCESSING ENGINE SERVICE

(71) Applicant: Brightcove Inc., Boston, MA (US)

(72) Inventors: Albert John McGowan, Phoenix, AZ (US); Nicholas Maultsby, Phoenix, AZ (US); Niko T. J. Huffman, Chandler, AZ (US); Christian D. Moosman, Phoenix, AZ (US)

(73) Assignee: Brightcove Inc., Boston, MA (US)

( * ) Notice: Subject to any disclaimer, the term of this patent is extended or adjusted under 35 U.S.C. 154(b) by 0 days.

(21) Appl. No.: 14/069,961

(22) Filed: Nov. 1, 2013

(65) Prior Publication Data

US 2014/0316899 A1    Oct. 23, 2014

Related U.S. Application Data

(60) Provisional application No. 61/815,111, filed on Apr. 23, 2013.

(51) Int. Cl.
    *G06Q 30/0251*      (2023.01)
    *H04N 21/234*      (2011.01)
    (Continued)

(52) U.S. Cl.
    CPC ... *G06Q 30/0264* (2013.01); *H04N 21/23424* (2013.01); *H04N 21/44016* (2013.01);
    (Continued)

(58) Field of Classification Search
    CPC .......... G06Q 30/0241; G06Q 30/0242; G06Q 30/0244; G06Q 30/0251; G06Q 30/0272;
    (Continued)

(56) References Cited

U.S. PATENT DOCUMENTS 7,065,712 B2    6/2006    Muto et al.
7,203,758 B2    4/2007    Cook et al.
(Continued)

FOREIGN PATENT DOCUMENTS

GB      2529766      3/2016
WO    WO-2013030096 A1 *   3/2013      ......... H04L 65/4076
WO    2014/176014 A1    10/2014

OTHER PUBLICATIONS

Manzato, Transcoding Evaluation in Live Video Adaptation, Oct. 1, 2006, IEEE, 2006 Fourth Latin American Web Congress, pp. 203-208.*

(Continued)

*Primary Examiner* — Arthur Duran
(74) *Attorney, Agent, or Firm* — Mughal Gaudry & Franklin PC

(57) ABSTRACT

Techniques described herein provide for a live advertising processing engine service to act as an intermediary between client applications and advertising networks. The live advertising processing engine service can provide an interface with which the client can interact, via an application programming interface (API) or directly through the use of a standardized language, thereby allowing client applications to receive advertisement data without the need to be customized to communicate with specific advertising networks. The live advertising processing engine service can further track where, in playback the live content, a client currently is, to indicate to the client—or other application—when advertisement breaks are and/or provide supplemental advertisement information to enable the client to provide a rich user experience.

20 Claims, 6 Drawing Sheets

(51) Int. Cl.
    *H04N 21/44*     (2011.01)
    *H04N 21/81*     (2011.01)
    *H04N 21/262*    (2011.01)
    *H04N 21/239*    (2011.01)
(52) U.S. Cl.
    CPC ....... *H04N 21/812* (2013.01); *H04N 21/2393* (2013.01); *H04N 21/262* (2013.01)
(58) Field of Classification Search
    CPC ........... G06Q 30/0276; G06Q 30/0277; G06Q 30/0264; H04N 21/23424; H04N 21/44016; H04N 21/812; H04N 21/262; H04N 21/2393
    See application file for complete search history.

(56) References Cited

U.S. PATENT DOCUMENTS

| | | | |
|---|---|---|---|
| 8,145,782 | B2 | 3/2012 | McGowan et al. |
| 8,301,733 | B2 | 10/2012 | McGowan |
| 8,327,012 | B1* | 12/2012 | Nguyen ............. H04L 67/1012 709/242 |
| 8,327,013 | B2 | 12/2012 | McGowan et al. |
| 8,442,858 | B1 | 5/2013 | Barnes et al. |
| 8,510,773 | B1 | 8/2013 | Abou-Rizk et al. |
| 8,881,243 | B2 | 11/2014 | Magyar et al. |
| 8,887,214 | B1 | 11/2014 | Black et al. |
| 9,762,639 | B2* | 9/2017 | McGowan ............. H04N 21/262 |
| 10,862,994 | B1* | 12/2020 | Ganjam ............... H04L 67/322 |
| 2002/0128908 | A1 | 9/2002 | Levin et al. |
| 2003/0066078 | A1* | 4/2003 | Bjorgan ............. H04N 21/4227 348/E7.061 |
| 2006/0004627 | A1 | 1/2006 | Baluja |
| 2008/0187279 | A1 | 8/2008 | Gilley et al. |
| 2008/0208668 | A1 | 8/2008 | Heller et al. |
| 2009/0031339 | A1 | 1/2009 | Pickens et al. |
| 2009/0249418 | A1* | 10/2009 | Alastruey Gracia ........................ H04N 21/6175 725/114 |
| 2009/0307722 | A1 | 12/2009 | Gross |
| 2010/0046633 | A1* | 2/2010 | Kasai ................. H04N 7/17318 725/114 |
| 2010/0251289 | A1* | 9/2010 | Agarwal ............. H04N 21/458 725/34 |
| 2010/0322213 | A1 | 12/2010 | Liu et al. |
| 2011/0015989 | A1 | 1/2011 | Tidwell et al. |
| 2011/0088076 | A1* | 4/2011 | Li .................... H04N 21/23113 725/114 |
| 2011/0138064 | A1 | 6/2011 | Reiger et al. |
| 2011/0161409 | A1 | 6/2011 | Nair et al. |
| 2011/0258049 | A1 | 10/2011 | Ramer et al. |
| 2011/0320287 | A1* | 12/2011 | Holt et al. ................. 705/14.73 |
| 2012/0005312 | A1* | 1/2012 | McGowan ............. G06F 16/41 709/219 |
| 2012/0047542 | A1* | 2/2012 | Lewis ............. H04N 21/44016 725/97 |
| 2012/0137015 | A1 | 5/2012 | Sun |
| 2012/0185608 | A1* | 7/2012 | McGowan ............. G06F 16/41 709/231 |
| 2012/0185895 | A1 | 7/2012 | Wong et al. |
| 2012/0284371 | A1* | 11/2012 | Begen ................. H04L 65/1069 709/219 |
| 2013/0198335 | A1* | 8/2013 | Goel ................... H04N 21/8456 709/219 |
| 2013/0219428 | A1* | 8/2013 | Jennings ............ H04N 21/4622 725/32 |
| 2013/0246577 | A1* | 9/2013 | Gonzales ................ H04L 65/80 709/219 |
| 2013/0268963 | A1 | 10/2013 | Nugent et al. |
| 2013/0290557 | A1* | 10/2013 | Baratz ..................... H04L 65/60 709/231 |
| 2013/0317919 | A1* | 11/2013 | Raman ................. H04N 19/197 715/753 |
| 2014/0020036 | A1 | 1/2014 | Hasek et al. |
| 2014/0143046 | A1 | 5/2014 | Doe et al. |
| 2014/0150019 | A1* | 5/2014 | Ma ..................... H04N 21/8547 725/34 |
| 2014/0208374 | A1* | 7/2014 | Delaunay ......... H04N 21/23439 725/109 |
| 2014/0236739 | A1 | 8/2014 | MacTiernan et al. |
| 2014/0259044 | A1* | 9/2014 | Kirby ................. G06Q 30/0207 725/23 |
| 2014/0337127 | A1 | 11/2014 | Morel et al. |
| 2020/0344320 | A1* | 10/2020 | Ganjam ............. G06F 11/3082 |

OTHER PUBLICATIONS

International Search Report and Written Opinion for PCT/US2014/032850, dated Aug. 29, 2014, 14 pages.
U.S. Appl. No. 14/341,674, filed Jul. 25, 2014, Non-Final Office Action dated Jan. 29, 2015, 29 pages.
U.S. Appl. No. 14/341,674, filed Jul. 25, 2014, Non-Final Office Action dated Nov. 20, 2015, all pages.
International Preliminary Report on Patentability for PCT/US2014/032850 dated Oct. 27, 2015, 9 pages.
Examination Report for GB1518653.9 dated Oct. 27, 2016, all pages.
Office Action for GB1518653.9 dated Jan. 8, 2016, 1 page.
U.S. Appl. No. 14/341,674, filed Jul. 25, 2014, Final Rejection dated Dec. 1, 2016, all pages.
Examination Report No. 1 for standard patent application AU 2014257422 dated Apr. 13, 2017, all pages.
Decision to Grant for GB1518653.9 dated Jan. 31, 2017, all pages.
Examination Report No. 2 for AU Patent Application No. 2014257422 dated Apr. 3, 2018, 4 pages.
Examination report dated Jun. 29, 2018 in related Australian application No. 2018202556, all pages.
Second Examination Report dated Dec. 6, 2018 in Australian Patent Application No. 2018202556, all pages.
Examination Report No. 3 for Australian Patent Appln No. 2018202556 dated May 22, 2019, all pages.
Office Action dated Apr. 15, 2020 for Canadian Application No. 2,909,517, 4 pages.

* cited by examiner

LIVE AD PROCESSING ENGINE SERVICE

CROSS-REFERENCES TO RELATED APPLICATION

This application claims the benefit of U.S. Provisional Application No. 61/815,111, entitled "Live Ad Processing Engine Service (APES)," filed Apr. 23, 2013. The above-listed application is hereby incorporated by reference in its entirety for all purposes.

BACKGROUND OF THE INVENTION

The delivery of media over data networks such as the Internet is in high demand. This is due, in large part, to much of the media being ad supported. Advertising ("ad") networks can provide the advertisements needed to support the playback of the media. Ad insertion for on-demand video is relatively straightforward, because the length of the entire on-demand video is known ahead of time. Thus, the entire play session can be planned and the advertising determined at the time the video is requested, resulting in a single response.

Ad insertion for live content can be more complex. Live content, by its very nature, is of unknown duration and the designated times for advertising may arise at any point in the stream with little warning. Thus, mediating requests for advertising and providing a single response (in, for example, the Interactive Advertising Bureau (IAB) Digital Video Multiple Ad Playlist (VMAP) format) can be challenging.

BRIEF SUMMARY OF THE INVENTION

Techniques described herein provide for a live advertising processing engine service to act as an intermediary between client applications and advertising networks. The live advertising processing engine service can provide an interface with which the client can interact, via an application programming interface (API) or directly through the use of a standardized language, thereby allowing client applications to receive advertisement data without the need to be customized to communicate with specific advertising networks. The live advertising processing engine service can further track where, in playback the live content, a client currently is, to indicate to the client—or other application—when advertisement breaks are and/or provide supplemental advertisement information to enable the client to provide a rich user experience.

An example method of providing advertising data related to live media content via a data communications network, according to the disclosure, includes receiving a stream of data representing the live media content, receiving an indication of a period of time in the live media content designated for advertising, and providing an application programming interface (API) accessible, via the data communications network, to a client device. The method further includes determining, with a processing unit, a time at which the client device began receiving the live media content, based on a request from the client device for an encoded segment of the live media content, and sending, via a communication interface, an indication of the period of time in the live media content during which one or more of a set of predetermined behaviors described by the API can be implemented by the client device. The indication of the period of time can be based on the determined time at which the client device began consuming the live media content.

The example method of providing advertising data related to live media content via a data communications can include one or more of the following features. The set of predetermined behaviors can include at least one of displaying an interstitial banner, displaying overlay advertisements, blocking fast forward controls, enabling interactive content, and providing tracking beacons to monitor a corresponding playback experience of a user. The method can include providing the indication of the period of time in Digital Video Multiple Ad Playlist (VMAP) format. The method can include determining one or more advertising networks based on one or more business rules. The one or more business rules can be determined based on a request from the client device for advertisement information. The method can further include receiving, from the one or more advertising networks, advertising information, and sending, via the communication interface, an indication to the client device of which of the set of predetermined behaviors described by the API to implement, where the indication of the predetermined behaviors to implement can be based on the advertising information. The indication of the predetermined behaviors to implement can include the advertising information. A non-transitory computer-readable medium can have instructions embedded thereon which, when executed by the processing unit, cause one or more machines to perform the example method.

An example server configured to provide advertising data related to live media content via a data communications network, according to the disclosure, includes a communication interface, a processing unit communicatively coupled with the communication interface, and a memory communicatively coupled with the processing. The memory has instructions embedded thereon which, when executed by the processing unit, cause the server to perform functions including receiving a stream of data representing the live media content, receiving an indication of a period of time in the live media content designated for advertising, and providing an application programming interface (API) accessible, via the data communications network, to a client device. The instructions further cause the server to perform functions including determining, with the processing unit, a time at which the client device began receiving the live media content, based on a request from the client device for an encoded segment of the live media content, and sending, via the communication interface, an indication of the period of time in the live media content during which one or more of a set of predetermined behaviors described by the API can be implemented by the client device. The indication of the period of time can be based on the determined time at which the client device began consuming the live media content.

The example server configured to provide advertising data related to live media content via a data communications network can include one or more of the following features. The memory can further include instructions for defining the set of predetermined behaviors to include at least one of displaying an interstitial banner, displaying overlay advertisements, blocking fast forward controls, enabling interactive content, and providing tracking beacons to monitor a corresponding playback experience of a user. The memory can further include instructions for providing the indication of the period of time in Digital Video Multiple Ad Playlist (VMAP) format. The memory can further include instructions for determining one or more advertising networks based on one or more business rules. The memory can further include instructions for determining the one or more business rules based on a request from the client device for advertisement information. The memory can further include instructions for receiving, from the one or more advertising networks, advertising information, and sending, via the communication interface, an indication to the client device of which of the set of predetermined behaviors to implement described by the API to implement, where the indication of the predetermined behaviors to implement is based on the advertising information. The memory can further include instructions for including, in the indication of the predetermined behaviors to implement, the advertising information.

Another example method of providing advertising data related to live media content via a data communications network, according to the disclosure, can include receiving a stream of data representing the live media content, receiving an indication of a period of time in the live media content designated for advertising, determining, with a processing unit, a time at which a client device began receiving the live media content, based on a request from the client device for an encoded segment of the live media content; and sending, via a communication interface, a manifest file having an indication of the period of time in the live media content during which one or more of a set of predetermined behaviors can be implemented by the client device. The indication of the period of time can be based on the determined time at which the client device began consuming the live media content.

The example method of providing advertising data related to live media content via a data communications network can include one or more of the following features. The set of predetermined behaviors can include at least one of displaying an interstitial banner, displaying overlay advertisements, blocking fast forward controls, enabling interactive content, and providing tracking beacons to monitor a corresponding playback experience of a user. The method can include determining one or more advertising networks based on one or more business rules. The one or more business rules can be determined based on a request from the client device for advertisement information. The method can include receiving, from the one or more advertising networks, advertising information, and including, in the manifest file, an indication of which of the set of predetermined behaviors to implement, based on the advertising information.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing various embodiments of the invention. It is understood that various changes may be made in the function and arrangement of elements without departing from the spirit and scope as set forth in the appended claims.

The terms "ad" and "advertisement," including alternate forms thereof, refer to marketing content distinct from user-requested media content. Although the techniques described herein discuss obtaining and providing advertising data, they also can be applied to data for content other than advertising. Furthermore, although techniques described herein are often provided in the context of video streaming, they can be applied to other forms of media content (e.g., audio streaming) as well. A person of ordinary skill in the art will recognize many alternate applications.

It can be noted that, although embodiments disclosed herein describe techniques as implemented by a cloud-hosted integrated multi-node pipelining system (CHIMPS), embodiments are not so limited. Other systems may be configured to implement the techniques disclosed.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. Much of this media is ad-supported, allowing media content providers to receive advertising revenue from media content, while often allowing end users to consume the media content free of charge.

Figure 1:
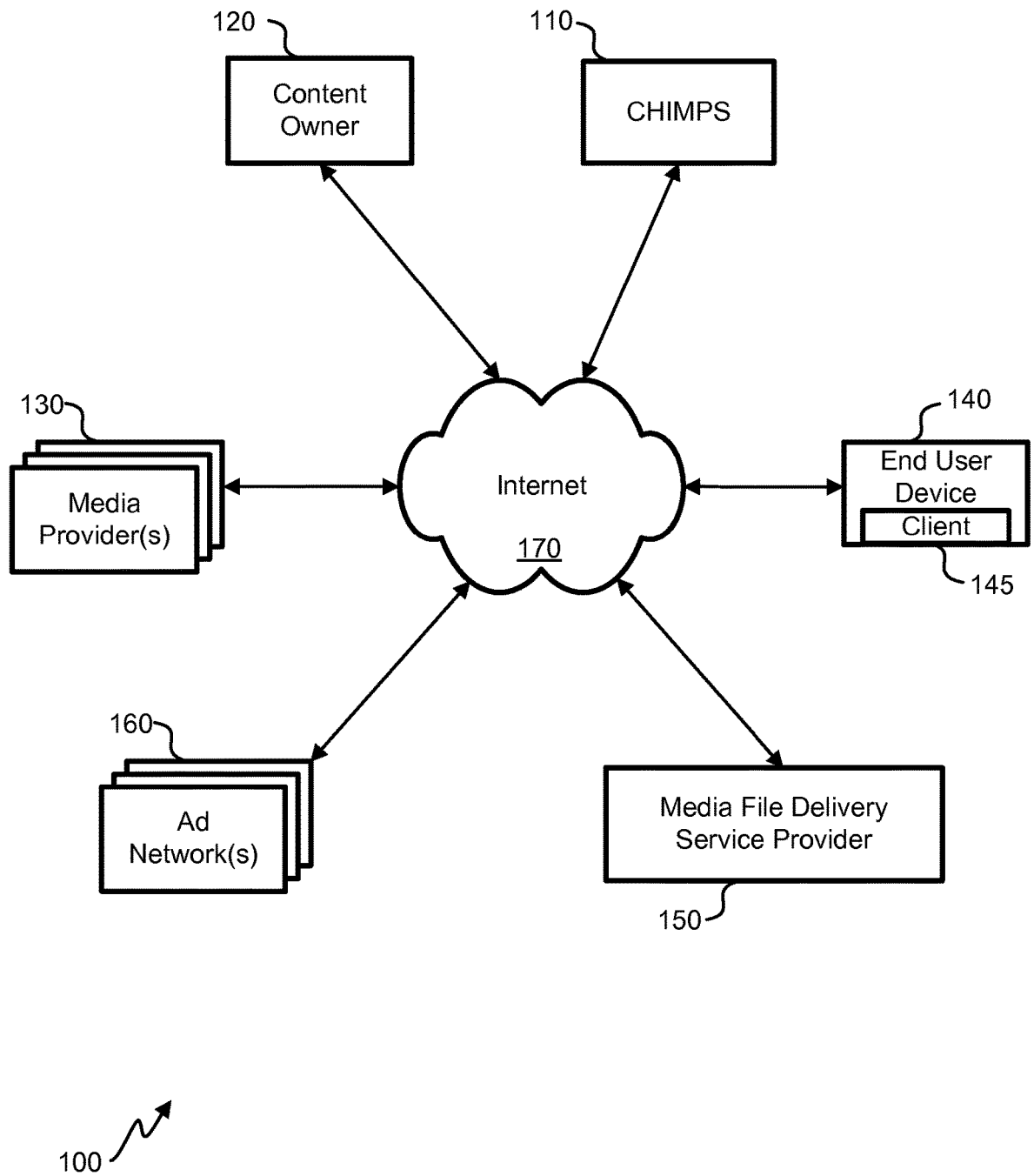
FIG. 1 is a block diagram illustrating a media servicing system, according to one embodiment of the present invention.

Advertisements are often stored and maintained separate from the primary media content. The distribution of ad-supported media via the Internet can therefore involve a variety of entities. FIG. 1 is a block diagram illustrating a media servicing system 100, according to some embodiments of the present invention. The system may deliver media content to a client 145, executed by an end user device 140 providing media playback to an end user. The client 145 can be, for example, a media player, browser, or other application adapted to request and/or play media files. The media content can be provided via a network such as the Internet 170 and/or other data communications networks, such as a distribution network for television content. The end user device 140 can be one of any number of devices configured to receive media over the Internet 170, such as a mobile phone, tablet, personal computer, portable media device, set-top box, video game system, etc. Although only one client 145 and one end user device 140 are shown in FIG. 1, it will be understood that the media servicing system 100 can provide media to many (hundreds, thousands, millions, etc.) of clients 145 on many (hundreds, thousands, millions, etc.) of end user devices 140.

For on-demand content (e.g., requested media that is stored in its entirety), a media file provided by one or more media providers 130 can be processed and indexed by cloud-hosted integrated multi-node pipelining system (CHIMPS) 110. The media file may be stored on media file delivery service provider (MFDSP) 150, such as a content delivery network, media streaming service provider, cloud data services provider, or other third-party media file delivery service provider. Additionally or alternatively, the CHIMPS 110 may also be adapted to store the media file. On-demand content can be provided to the client 145 via progressive downloading and/or streaming.

For live content (e.g., requested content that is sent to one or more end user devices 140 as it is received from media provider(s) 130, that is, in real time or near-real time, depending on processing times and/or other buffer times), a similar process can take place. For example, media provider (s) 130 can provide a media stream (e.g., live video), which is processed and indexed by the CHIMPS 110. Encoded segments of the media stream can be stored as files (i.e., "chunks"), on the media file delivery service provider (MFDSP) 150 and/or the CHIMPS 110. Embodiments may have a delay from the time the media stream is received from the time the associated content is stored and available for streaming to the one or more end user devices 140. The delay can be due to transcoding and/or other types of processing for making the received media stream available for downloading. This delay can create a buffer period of time in which one or more of the techniques described herein can take place, such as processing cue tones and/or placing ads in the content. (These techniques are described in greater detail below.)

Both on-demand and live content can utilize any of a variety of forms of streaming media. One such method is chunk-based media streaming in which a media file or live stream is processed into smaller segments, or "chunks," and stored (e.g., in a server of the CHIMPS 110 or Media File Delivery Service Provider 150) for serving to a client 145. The client 145 can make a URL request to the CHIMPS 110, which can provide a manifest file (also known as an index file) indicating the locations of each of the chunks of media using, for example, Uniform Resource Indicators (URIs) (e.g., Universal Resource Locators (URLs)) or other indicators. The client 145 can then use the information in the manifest file to stream the media content, following one location after the other to download each chunk of media. Additional detail regarding such chunking and indexing, as well as techniques for dynamically creating chunks and manifest files, can be found in U.S. Pat. No. 8,327,013 entitled "Dynamic Index File Creation for Media Streaming" and U.S. Pat. No. 8,145,782, entitled "Dynamic Chunking For Media Streaming," both of which are incorporated by reference herein in their entirety.

The CHIMPS 110 can further manage the processing and syndication of media (live or on-demand) received from the media provider(s) 130. For example, the CHIMPS 110 can provide transcoding and other services to enable media provided by the media provider(s) to be distributed in a variety of formats to a variety of different device types in a variety of locations. Furthermore, the CHIMPS 110 provide feedback to the media provider(s) 130 regarding the media's syndication, including user behavior during media playback. For example, the CHIMPS 110 can provide a media provider 130 with information indicating that end users tend to stop watching a video at a certain point in playback, or that users tended to follow links associated with certain advertisements displayed during playback. With this data, media provider(s) 130 can adjust factors such as media content, advertisement placement and content, etc., to increase revenue associated with the media content and provide the end user device 140 with a more desirable playback experience. Additionally or alternatively, the CHIMPS 110 can dynamically provide a customized playback experience on the end user device 140 according to aspects of the context associated with the content at the time of the request, aspects of the content request itself, or both. It can be noted that although embodiments herein may utilize media files and live streams explicitly, other embodiments may utilized other forms of media assets, such as dynamic web pages, and may incorporate multiple media elements, including players, user interface components, user controls and control components, images, and other media content, objects, or types. Additionally, it can be noted that various functions, operations, processes, or other aspects that are described in this example, and other examples, as being performed by or attributable to the CHIMPS 110 can be performed by another system operating in conjunction with the CHIMPS 110, loosely or tightly synchronized with the CHIMPS 110, or independently; for example, collecting data from other digital services to be combined and reported with data collected by the CHIMPS 110 can, in some implementations, be performed by a system other than the CHIMPS 110. Additional detail regarding the functionality of the CHIMPS 110 can be found in U.S. Pat. No. 8,301,733, entitled "Dynamic Chunking for Delivery Instances," which is incorporated by reference herein in its entirety.

A content owner 120 can utilize one or more media provider(s) 130 to distribute media content owned by the content owner 120. For example, a content owner 120 could be a movie studio that licenses distribution of certain media through various content providers 130 such as television networks, Internet media streaming websites and other on-demand media providers, media conglomerates, and the like. In some configurations, the content owner 120 also can operate as a media provider 130.

The content owner 120 and/or media provider(s) 130 can enter into an agreement with one or more ad network(s) 160 to provide advertisements to numerous clients 145 on numerous end user devices 140. In this manner, the ad network(s) 160 allow companies to show advertisements to end users viewing the media content from the media provider(s) 130. Because ad network(s) 160 can maintain advertisements and/or advertisement data separate from media content, the advertisements can be updated and subject to business rules such that, two users viewing the same media content at different times and/or in different locations may see different advertisements.

Different ad networks 160 often provide advertisement data to a client 145 in a proprietary language and/or format. Because it can be costly and time consuming to develop a client 145 using an SDK of a particular ad network 160, media provider(s) 130 and/or other entities that create clients 145 for media playback find it difficult to access advertisements from other ad networks 160. Furthermore, clients 145 may need to be updated whenever the ad network 160 for which the client was programmed makes any adjustments in its proprietary language and/or format. Some clients may allow for plugins to be utilized by an existing client 145 to communicate with different ad networks 160. However, it can still be time consuming and costly to separately integrate each of these plugins into a client 145. Problematically, many ad networks 160 are unable to fulfill the needs of a media provider 130 on their own. Thus, many media provider(s) and/or other entities that create clients 145 for media playback are forced to adapt their clients 145 to communicate with multiple ad networks 160 to fill up the allotted time slots for advertisements.

Furthermore, advertisements may be inserted directly into content consumed by the client, in which case the client may not be able to differentiate between media content and advertising content. In such instances, the client may not be able to provide a user with any additional features associated with an advertisement, such as a click-through hyperlink, banner, or other features.

Techniques provided herein can be utilized in conjunction with a Live Advertising Processing Engine Service (APES) to avoid problems at arise from advertising during the consumption of live content by a client.

Figure 2:
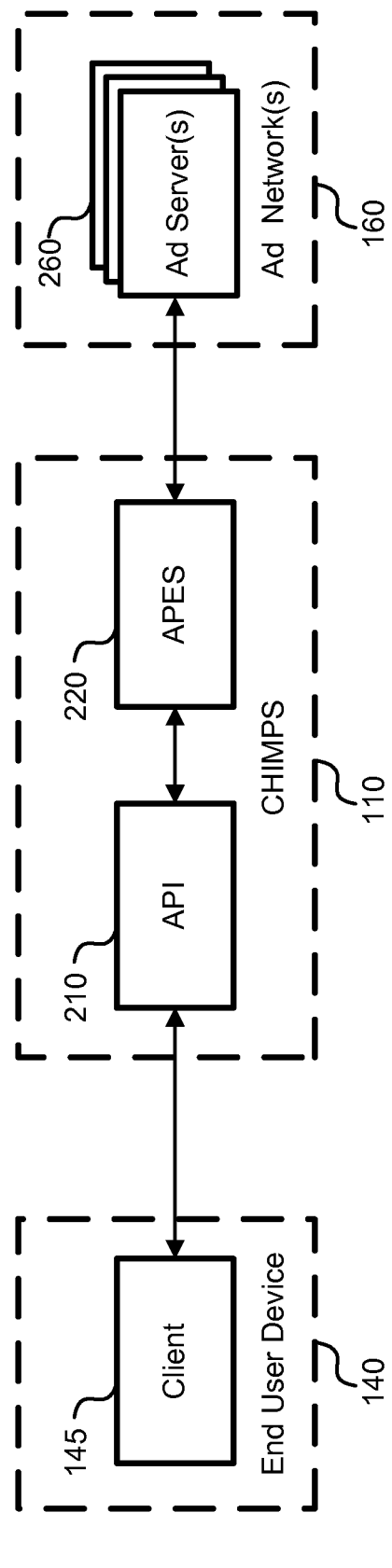
FIG. 2 is simplified block diagrams illustrating embodiments of systems utilizing an advertising processing engine service (APES).

FIG. 2 is a simplified block diagram illustrating a system 200 utilizing an APES 220, according one embodiment. In this context, the APES may be used for both live and on-demand media content. The system 200 can comprise a client 145, application programming interface (API) 210, APES 220, and one or more ad servers 260. As shown, these components can be incorporated into larger systems, such as the end user device 140, CHIMPS 110, and/or advertising network(s) 160 as shown in FIG. 1. In other embodiments, however, the APES 220, API 210, and/or other components may be incorporated differently into a larger system and/or may be stand-alone components. Furthermore, other embodiments may combine, separate, add, omit, substitute, and/or modify components of the system 200, while providing the same overall functionality as described herein.

The client 145 can interface with the API 210 to retrieve media and/or advertisement data, as well as access any other services of the CHIMPS 110. Accordingly, the client 145 need only be programmed for the routines, data structures, object classes, variables, etc. of the API 210, without being specially tailored to accommodate interaction with a particular ad network 160.

The API 210, in turn, can determine whether advertisements are needed in response to a request from the client 145. If so, the API 210 can determine the number of advertisements needed (ad count), duration of each, and other data to provide in a call to the APES 220, such as metadata for the requested media item, information from the client, custom parameters for client configuration, and the like. The API can make a call to the APES 220 with the request.

The APES 220 can act as an intermediary between the client 145 and the advertising network(s) 160 by providing an interface with which the client 145 can interact, via the API 210 (and/or, in some embodiments, directly through the use of a standardized language), thereby allowing the client 145 to receive advertisement data without the need to be customized to communicate with specific advertising network(s) 160. On the other hand, the APES 220 can receive requests from clients and communicate these requests to advertising network(s) 160 in the corresponding language and/or format they require. The APES 220 can make corresponding call(s) to the ad network(s) 160 using the format required by each of the ad network(s) 160, passing along information that the ad network(s) 160 might need to provide the proper advertisements (for example, in accordance with agreements between the ad network(s) 160 and media provider(s) 130). Such information could include, for example, geographical data related to the location of the client 145, data (title, duration, genre, etc.) regarding the media content requested by the client, and the like.

In response to the request from the APES 220, the ad server(s) 260 can provide advertisement data for use in the playback of the media content. The advertisement data can include information enabling the advertisements to be incorporated into the playback of the media content, such as a URL of the advertisement, one or more accompanying tracking URLs, and other information. In addition to providing advertisement data for playing video advertisements, an ad network 160 can provide supplemental information to a client 145 to enable the client 145 to add or alter interactive features. For example, additional information, such as a URL, can be passed to a client 145 to provide a "click through" URL that allows a user to click or otherwise select the video advertisement to evoke web content related to the advertisement (e.g., a web page of the advertiser and/or advertised product). In another example, information can be provided to the client 145 causing the client 145 to hide or inactivate some or all of controls of media player application during playback of an advertisement.

The system 200 further overcomes issues that can arise when an ad network 160 redirects a request to a different ad network 160. In general, ad networks 160 have an inventory of advertisements. Due to different business rules that may apply to different advertisements (e.g., geographical constraints, time constraints, etc.), this inventory may run out in certain circumstances. For example, a particular company or advertising company may, as part of an advertising campaign, pay a first ad network for one million impressions for a given month. Once the million impressions are made, the first ad network is no longer permitted to show ads from that advertising campaign. If the first network 160 is otherwise unable to fulfill a request for advertisement data (e.g., provide an advertisement for a particular time slot), it may redirect the request to a second ad network 160 in accordance with an agreement between the first and second ad networks (typically sharing profits from fulfilling the request). If the second ad network 160 is also unable to fulfill the request, it may also redirect the request. This process can continue until the request is fulfilled or ultimately fails. If the request is finally fulfilled, the response can include data from each of the ad networks involved. And because each ad network may respond to advertisement requests in a proprietary manner, parsing the final response can involve complex and difficult logic. Unlike systems that would require a client 145 to execute this difficult logic, the system 200 parses the response before it ever reaches the client. Thus, the system 200 allows for server-side functionality to handle difficult issues arising from redirects, providing advertising data in a standardized format. Depending on desired functionality, advertising data can include, an advertisement and/or a URL of an advertisement, one or more tracking URLs, information regarding interactive content (discussed in more detail below), and/or other information.

It can be noted that each of the components of the system 200 can implement different business rules to provide advertisement data that comports with the requests of media provider(s) 130, content owners 120, and/or other stakeholders. Moreover, the API 210 can pass along information, provided in a request from the client 145, to the APES 220 that may include contextual and/or other data to inform business rules executed by the APES 220. Similarly, the APES 220 may pass along information that may inform business rules executed by the ad network(s) 160. Such information can include information provided in the original request from the client 145, and/or subsequently added by another component. In some embodiments, the request from the client 145 can not only inform business rules, but also provide new business rules to be implemented by the API 210, APES 220, and/or ad network(s) 160. Furthermore, information may be passed to the ad network(s) 160 that is not utilized by the API 210 or APES 220.

Additional detail regarding the functionality of the APES 220 for on-demand media streaming can be found in U.S. patent application Ser. No. 13/748,791, entitled "Advertising Processing Engine Service," which is incorporated by reference herein in its entirety.

Figure 3:
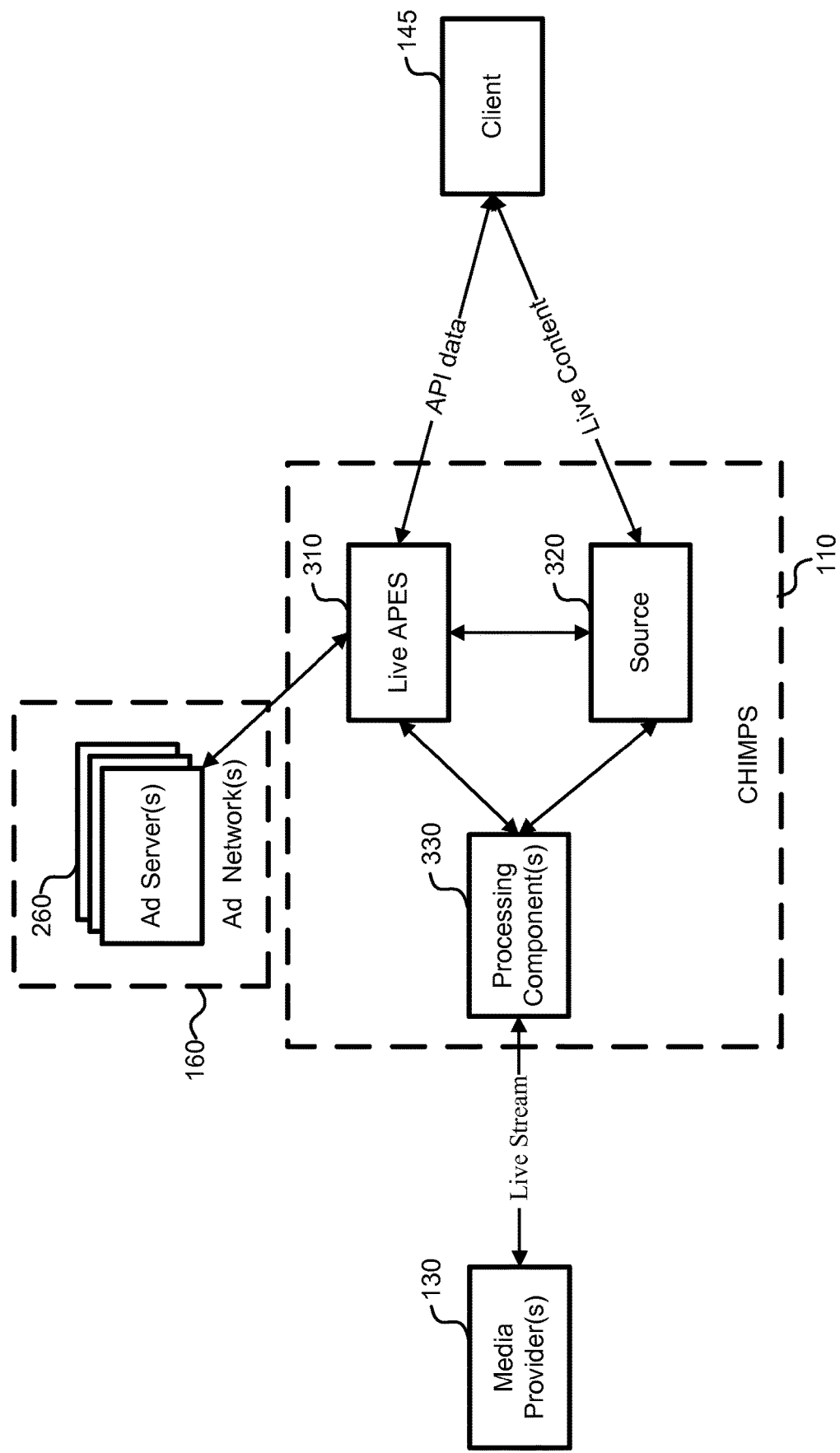
FIG. 3 is a simplified block diagram illustrating a configuration in which the APES (Live APES) is adapted to provide supplementary information to a client in a live streaming environment, according to one embodiment.

FIG. 3 illustrates a configuration 300 in which the APES—shown here as Live APES 310—is adapted to provide supplementary information to a client in a live streaming environment, according to one embodiment. This functionality can be in addition or an alternative to providing the intermediary functionality described in regards to the APES 220 system of FIG. 2. It will be understood that other embodiments may include more or fewer components, may omit and/or add components, and/or situate components differently. The source 320 (e.g., a system that maintains and/or serves the live content) and Live APES 310 can, for example, be separately maintained (rather than part of a single CHIMPS 110). Other embodiments, however, may integrate the two into a single functional component. As illustrated in FIG. 1, the client 145 can be communicatively coupled with the other illustrated components via the Internet 170 (not shown in FIG. 3) and/or other data communication networks.

The configuration 300 provides server architecture that can implement a methodology whereby requests for advertising content to be delivered during a media streaming experience to the client 145 can be mediated via the Live APES 310. Similar to the APES 220 of FIG. 2, the Live APES can employ an API (not shown), such as a RESTful API, that can intelligently apply business rules to determine the ideal advertisements to serve on a per-session basis. In some embodiments, a standardized language may be used instead of or in addition to an API. The Live APES 310 can then create a response that allows the client 145 to provide a rich user experience that otherwise may not be available.

Here, the term "rich user experience" can include any of a variety of functionality in addition to the delivery of the media content. For example, the Live APES 310 can provide client 145 with a response that provides the client 145 the ability to display interstitial banner and/or overlay advertisements, the ability to keep the user from skipping through a linear video advertisement (e.g., by blocking and/or hiding user controls), the ability to follow hyperlinks to gain more information about the subject of an advertisement, the ability to provide tracking beacons to monitor the playback experience of the user, and the like. To provide this functionality, the information provided by the Live APES 310 can include, for example, a time and duration of an advertisement, an advertisement and/or supplementary advertisement (e.g., a picture, banner, etc.), a hyperlink (e.g., URL) to an advertiser's website, a tracking URL, and the like, which can be obtained from the ad server(s) 260 and/or other sources.

Without the supplemental information provided by the Live APES 310, the client 145 may not be able to provide any functionality other than play advertising content. Many types of clients, for example, are unable to determine any information regarding live content other than a duration that the content is played. The client 145 can provide this to a browser and/or operating system. But without any additional information regarding the content of the advertisement, the browser and/or operating system can do little to provide a rich user experience without information regarding the advertisements or any indication of when the advertisements are played. Techniques disclosed herein address this issue by providing, with the Live APES 310, supplementary data (e.g., the "API data" indicated in FIG. 3) in addition to the live content, enabling a client 145 (and/or other software on the end-user device 140, such as a browser, operating system, etc.) to know when ad playback occurs and provide a rich user experience during that time. To this end, some embodiments allow for live content to be provided to the client 145, while the API data is provided to a browser, operating system, and/or other software running on the end-user device 140.

A typical live "stream," obtained from media provider(s) 130, can include continuous data being created from recording and primary encoding equipment. It can include a first set of one or more "content" segments (e.g. a sporting event, a news report, etc.), followed by a first advertising "break" during which advertising is intended to be shown. After the first advertising break, there can be a second set of one or more content segments, a second advertising break, and so forth. Advertising breaks can be determined by the media provider(s) 130 and indicated by "cue tones," which are analog or digital signals which indicate in a first form that a break is about to begin. Cue tones can also indicate in a second form that the break is about to end. These cue tones can occur at any point in the stream, and in many circumstances the timing of the breaks is not known before the live stream is initiated. Furthermore, the overall duration of a live stream is often not known. In some circumstances, for instance, live streams are continuous for hours, or days, or weeks or longer. Additionally, the time at which a client 145 begins to consume live content can be at any point during its duration, not solely at the beginning of the content.

Because of these factors, live streams can present unique challenges to a mediating ad processing engine, namely indeterminate content length and unknown advertising break timing and duration and indeterminate start time in the stream. As such, Live APES 310 can be configured to adapt in a manner that may be different from other systems.

First, the client behavior may change. Unlike mediating ad processing engines for on-demand content, in which the client can make a single request at the start of a play session and receives a single response (e.g., IAB Digital Video Multiple Ad Playlist (VMAP) response) describing the advertising entities pertinent to that play session, the Live APES 310 can receive multiple requests from the client 145 during the consumption of the live content. The Live APES 310 can respond to each request by providing supplemental information containing the advertising information pertinent to an impending play session segment. In some embodiments a single content delivery URI can be provided to the client 145, which can be consumed to deliver the live streaming content for that play session incorporating any linear media advertisements described by the Live APES 310 response.

Second, the Live APES 310 can perform just-in-time ad placement and mediation as the play session evolves. This is complicated by the fact that the advertising breaks are of unknown timing and duration. Thus, a global time offset is implemented whereby a user is artificially placed at an earlier point in the timeline of the live stream in order that the Live APES 310 can make use of a look-ahead buffer to process cue tones and place ads appropriately. This buffer is a result of the fact that live streaming segments are processed by the processing component(s) 330, which can cut, encode and deliver segments to the source 320, and thus the live content cannot be consumed by a client device until such time as the segment is complete. Moreover, such a time buffer is often a requirement of streaming live content. The Live APES 310 can take advantage of this buffer to perform its advertising mediation function. When an advertising break occurs (as indicated by cue tones in and/or associated with the live stream) the Live APES 310 can send a request for advertising to fill the time of the break across a plurality of advertising networks 160 based upon a first plurality of business rules that can be defined on a per live stream basis. Mediated requests can further be influenced by a second plurality of business rules that operate upon a plurality of client state metadata provided in the request itself.

The third feature that the Live APES 310 can incorporate to resolve the problems presented by live streams is the creation of a play session token for use in coordinating all responses to a particular client 145. Each client 145 that consumes live content may join that live stream at any point throughout its duration. Thus, the "beginning" of each play session (e.g., the live content first consumed by a client 145) can be different for each client 145. As such, the elapsed time in the play session to the beginning of an advertising break is directly related on a per-client basis to their start time in the stream.

Figure 4:
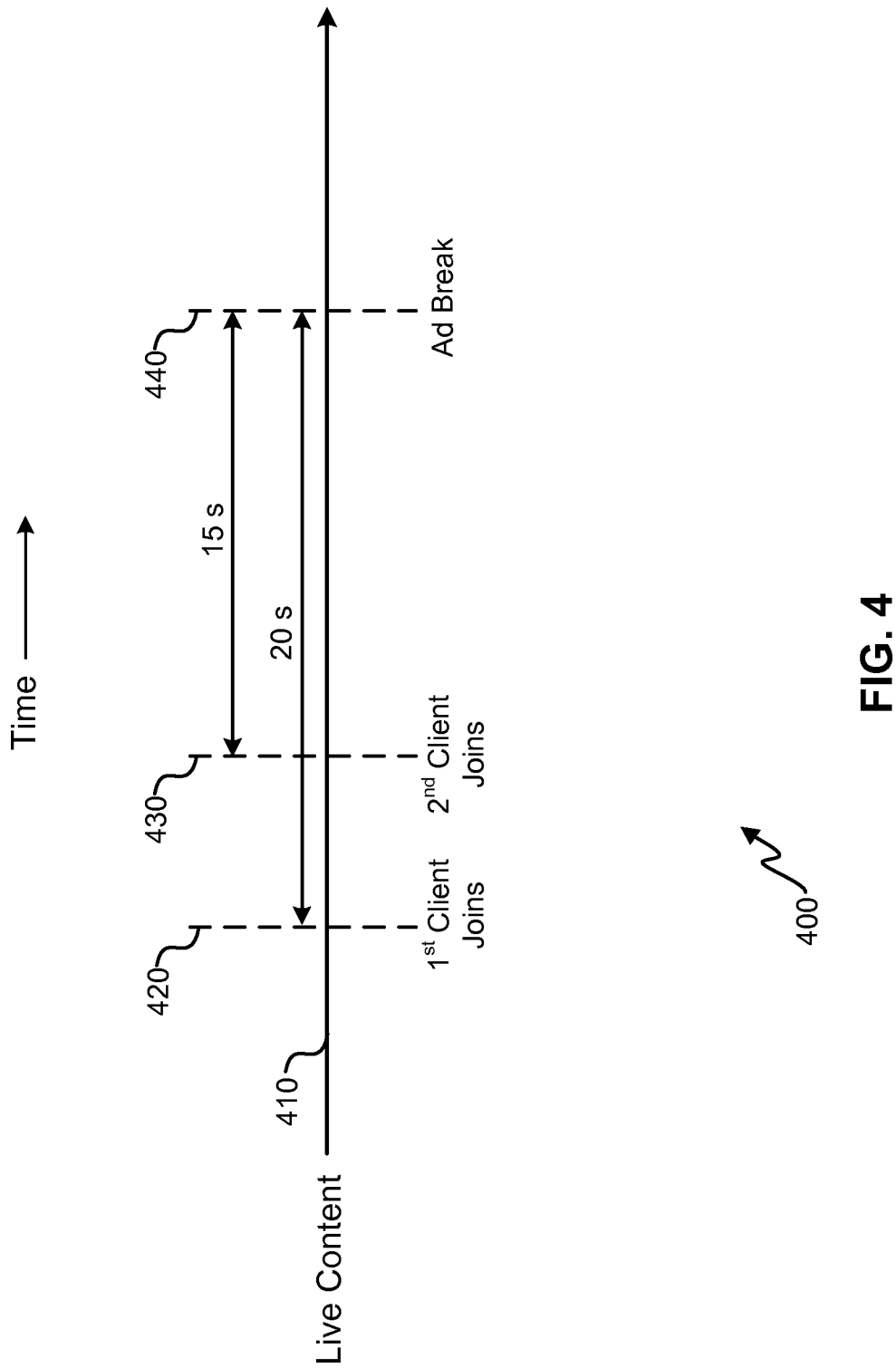
FIG. 4 is a timeline graph illustrating an example of how an ad break can occur at different points in playback, relative to different clients.

FIG. 4 is a timeline graph 400 provided to help illustrate this point. Live content consumed is represented as a line 410, and time elapsed during consumption is represented in space from left to right. Here, a first client joins at a first point in the live content 420, and begins consuming the live content. At a second point in the live content 430, a second client joints and begins consuming the live content. At a third point in the live content 440, an ad break begins. For the first client, the ad break begins after 20 seconds of live content consumption. For the second client, however, the ad break begins after 15 seconds of live consumption. Thus, to accommodate each client, ad information, including timing information, can be customized on a per-client basis. It can be noted that, due to various factors such as traffic shaping, load balancing, and the like, the first and second clients may be consuming the live content at different points in time. That is, clients can have different "session times," as described in further detail below. For example, they may be offset by a few seconds such that the first client reaches the ad break at 10:20:00 AM and the second client reaches the ad break a few seconds later, at 10:20:03 AM.

Referring again to FIG. 3, the Live APES 310 can receive information from the source 320. Because the source 320 can determine which encoded media segment (chunk) the client requests first, it can pass this information to the Live APES 310 which can keep track of when, in the live content, the client began streaming. Thus, there is the timeline of the live stream (hereinafter referred to as "real time") and a dependent timeline of the client play session (hereinafter referred to as "session time") which is offset from real time by a constant amount. The play session token can store, among other items, the constant amount by which session time is offset from real time by examining the embedded timestamps (e.g., presentation time stamp (PTS)) in the live stream at the time the play session initiates and noting their difference from the start of a client's consumption of live content. This token is then utilized on all subsequent requests in the play session to correctly set the session time at which an ad break begins and its dependent advertising entities are displayed so that the client 145 can provide a rich user experience. It can further be noted that, although a "token" is disclosed, embodiments may employ any of a variety of techniques for tracking session time of a client 145.

It can be noted that, although examples described herein are specific to VMAP, embodiments are not so limited. Embodiments can include any XML response (or any API call response). VMAP is used only as an example. Furthermore, techniques described herein not only work the case of ads being delivered in-stream but also as a signaling mechanism for the client to load something that is not in stream (like an overlay, for example). Embodiments may, additionally or alternatively, allow a client to utilize a single URI (e.g., a URL or other location indicator) for delivery of live content that will incorporate any linear video advertising described in the response of the Live APES 310.

Some embodiments may embed a response from the Live APES 310 directly into a manifest file. In such embodiments, the CHIMPS 110 and/or other system can provide chunk-based media streaming by providing a manifest file (e.g., in M3U8 format), in the manner previously described, indicating the location of media chunks to download for streaming the live content. Such embodiments can incorporate manifest file creation into the Live APES 310 and/or utilize another component (not shown in FIG. 3) to generate the manifest files. Rather than delivering API data in response to a separate API call, these embodiments can simply include supplementary information (advertisement information) in the manifest file itself, resulting in similar functionality as described above.

Embodiments embedding supplemental information in a manifest file can do so using any of a variety of techniques. For example, the Live APES 310 may provide an indicator in URLs of chunks of advertising content, flagging to the client 145 which chunks are related to advertising. Additionally or alternatively, the Live APES 310 can embed supplemental information as comments in a top-level manifest file. For instance, HTTP Live Streaming (HLS), utilizes the "#" character to indicate comments, which are typically ignored by the client 145. However, embodiments may exploit this feature by providing advertisement information in the manifest file by embedding a directive such as "#adtiming," followed by specific timing of an ad, to indicate a time during which the client 145 will be consuming advertising content. Correspondingly, clients 145 can be adapted to seek such embedded directives in the comments portion of the manifest file. Additional information may be similarly embedded to provide additional functionality (e.g., click-thru hyperlinks, control blocking, etc.) as described above. In some embodiments, protocols other than HLS can be utilized.

Figure 5:
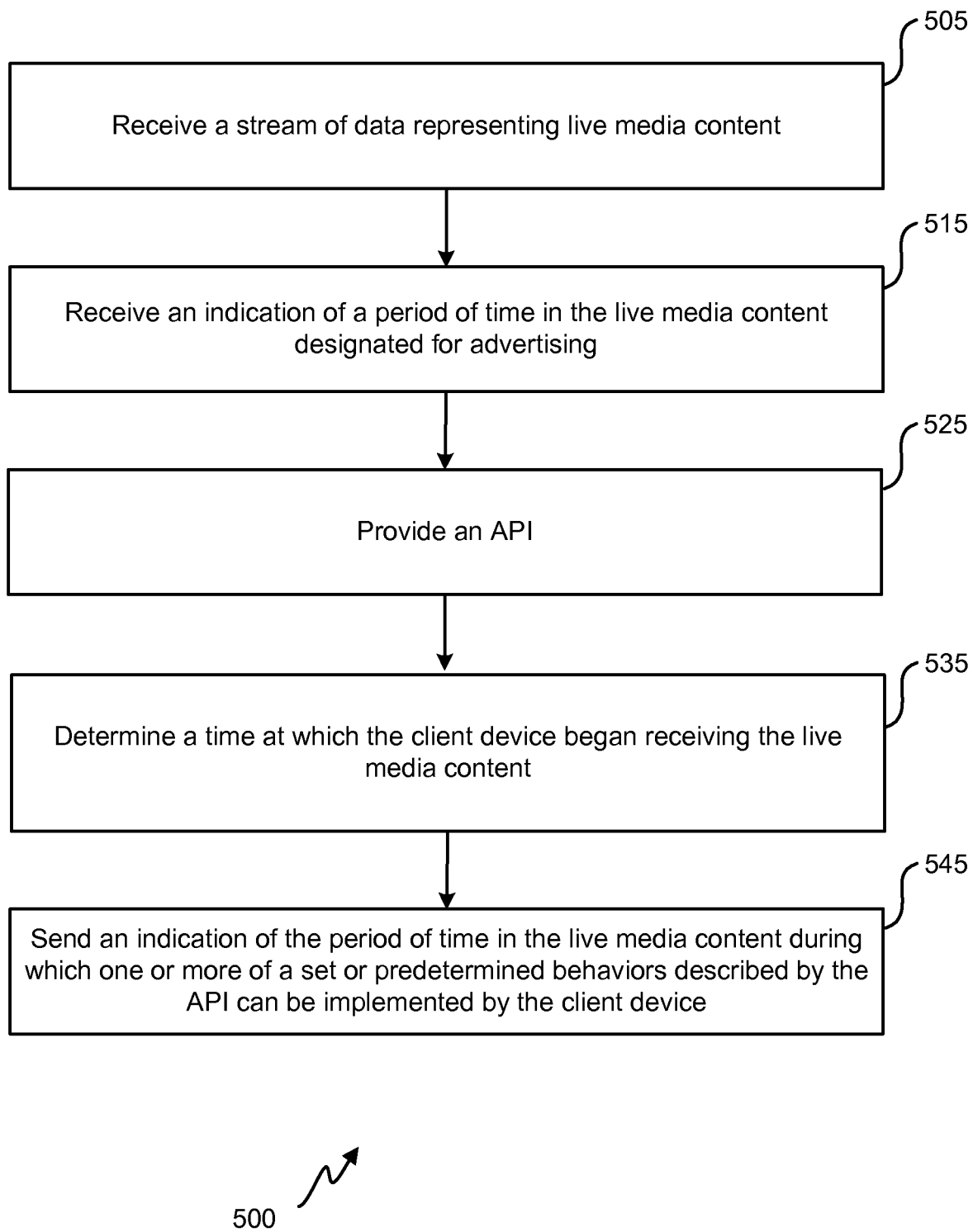
FIG. 5 is a simplified flow chart illustrating a process of providing advertising data related to live media content via a data communications network, according to one embodiment.

FIG. 5 is a simplified flow chart illustrating a process 500 of providing advertising data related to live media content via a data communications network, according to one embodiment. The process 500 can be implemented, for example, by the Live APES 310 described herein above, and/or another networked system. As with all other figures provided herein, FIG. 5 is provided as an example and is not limiting. Various blocks may be combined, separated, and/or otherwise modified, depending on desired functionality. Furthermore, different blocks may be executed by different components of a system and/or different systems. Such systems can include the computer system described herein below with regard to FIG. 6.

At block 505, a stream of data representing live media content is received. The stream of data can be a live stream as previously described with regard to FIG. 3, which can be provided by one or more media and/or content providers. The stream of data can be received via a data communication network, including the Internet and/or private and/or public data communication networks. As previously indicated, the stream of data may include embedded PTS data, which may be utilized by the Live APES (or other system) to help track "session time" of a client in relation to "real time" kept by the Live APES and/or other system. In some embodiments, the stream of data may not be received directly, but instead, a system can receive an indication that the stream of data is received (and is, for example, being processed for live streaming to a client).

An indication of a period of time in the live media content designated for advertising is received at block 515. As indicated above, this can comprise cue tones, which can be analog or digital signals embedded in the stream of data itself and/or received separately in conjunction with the stream of data. Also as previously described, separate cue tones can separately denote the beginning of a period of time in which ad content is to be played and the ending of that period of time.

At block 525, an API is provided. The API can interface with clients (e.g., media streaming applications) executed by any of a variety of end-user devices, such as personal computers, tablets, smart phones, televisions, set-top boxes, and the like. The API can include a series of instructions defining one or more predetermined behaviors to execute during the period of time in which advertising is being consumed (i.e., played) on the client. Furthermore, separate APIs may be utilized to stream data and provide such instructions. These APIs may interface with separate applications executed by the end-user device. For example, one or more APIs for streaming media content (e.g., providing manifest files and/or receiving beaconing information from a client) can interface with the client, while the API including the series of instructions defining the one or more predetermined behaviors may interface with an operating system and/or browser. Some embodiments may not utilize an API at all, depending on desired functionality.

At block 535 a time at which the client device began receiving the live media content is determined. As indicated previously, the system providing supplemental information regarding advertising (e.g., the Live APES) can be in communication with the system serving chunks of live media to a client. (e.g., the source). It can therefore be determined what chunk of the live media content is requested by the client and when, which can allow a system to determine both what portion of the live media content the client is consuming, and an elapsed time that the client has been consuming the live media content.

The functionality at block 545 involves sending an indication of the period of time in the live media content during which one or more of a set or predetermined behaviors described by the API can be implemented by the client device. That is, a system can flag to the client (and/or other software executed by an end-user device) when an advertisement will be played. The system can receive cue tones in the live media stream and, because of processing and/or deliberate buffering delays, provide an indication of when, in the live media content consumed by a client, an advertisement will be played. Furthermore, because the system knows an elapsed time that the client has been consuming live media content, it can provide this indication in terms understood by the client (which typically does not know anything regarding the live media content other than the elapsed time that the live media content has been consumed). For example, the indication can indicate that an advertisement will be shown when the elapsed time of consumption reaches 45 seconds. The indication may also indicate an end time and/or duration of the ad break. As previously discussed, some embodiments may provide the indication in a VMAP format. Some embodiments may provide the indication in a manifest file.

Predetermined behaviors can include any of a variety of behaviors, enabling the client to provide a rich user experience. Such behaviors can include, for example, displaying an interstitial banner, displaying overlay advertisements, blocking fast forward controls, enabling interactive content (e.g., click-through hyperlinks), and providing tracking beacons to monitor the playback experience of the user. In addition to the indication of when an advertisement will be played, on or more of these behaviors can be provided to a client.

A system configured to perform the functionality shown in FIG. 5 can be configured to perform additional features. For example, a system may determine one or more advertising networks based on business rules. The business rules can be determined based on a request from the client device. For example, a request from a client may include a client identifier, geographic location, and/or other information that can be used to determine which advertising networks to utilize. Depending on related business rules, different requests from different clients for the same video content may result in different advertisements. This can be due to, for example, differences in the time of the requests, location of the clients, client identifier, and the like. In addition to ad content, the ad networks can provide advertising information (e.g., URLs, banners, etc.) that can be provided by the Live APES (or other system) as supplemental information that can be used to provide a rich user experience. This supplemental information related to an advertisement can be included in and/or otherwise accompany the indication of when the advertisement will be played.

Figure 6:
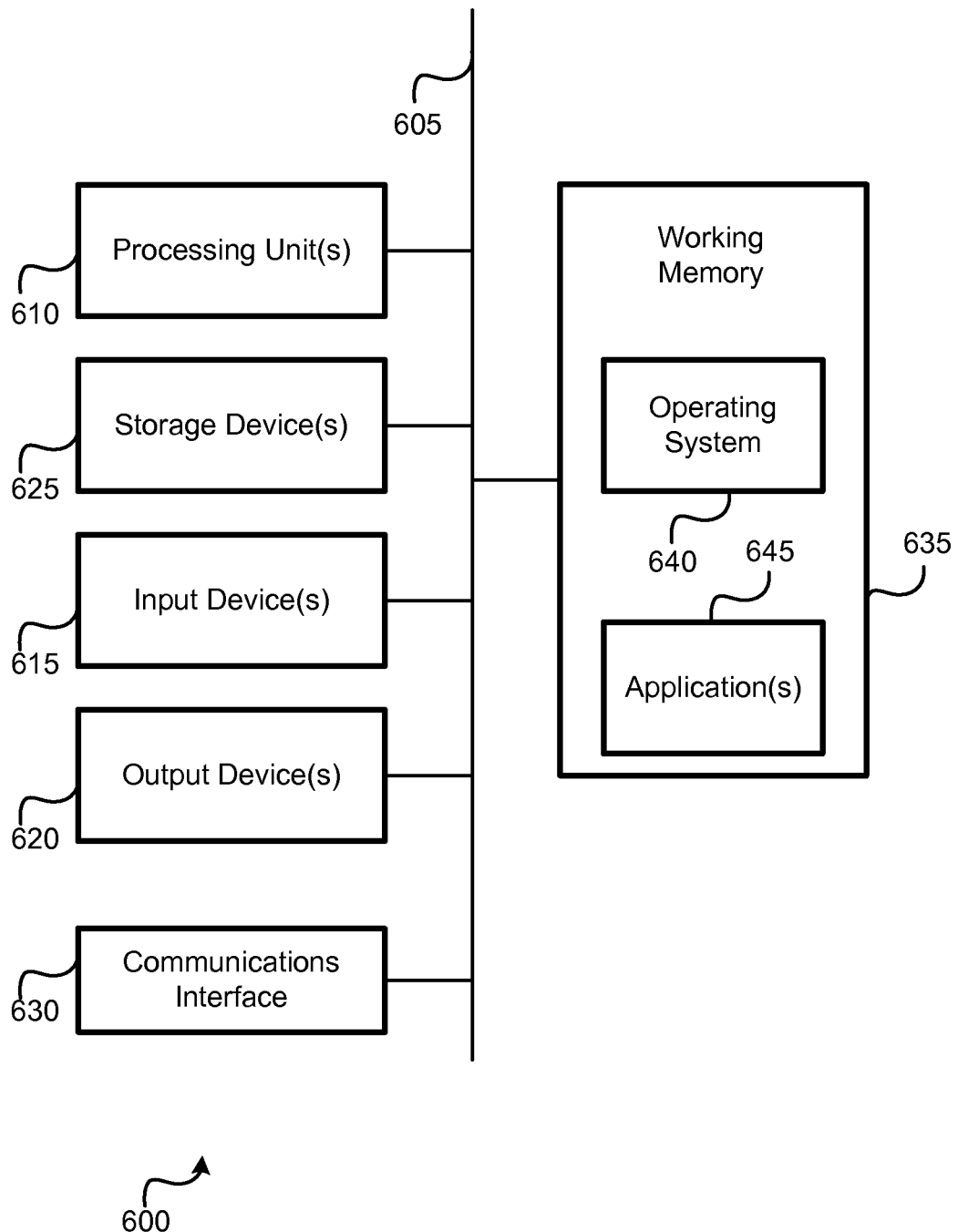
FIG. 6 is a block diagram of an embodiment of a computer system.

FIG. 6 illustrates an embodiment of a computer system 600, which may be configured to execute various components described herein using any combination of hardware and/or software. For example, the computer system 600 can be configured to execute the Live APES 310, API 210, client 145, and/or other components of the CHIMPS 110 and/or media servicing system 100, as described herein. FIG. 6 provides a schematic illustration of one embodiment of a computer system 600 that can perform the methods provided by various other embodiments, such as the method described in relation to FIG. 5. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner. In addition, it can be noted that components illustrated by FIG. 6 can be localized to a single device and/or distributed among various networked devices, which may be disposed at different physical locations.

The computer system 600 is shown comprising hardware elements that can be electrically coupled via a bus 605 (or may otherwise be in communication, as appropriate). The hardware elements may include processing unit(s) 610, which can include without limitation one or more general-purpose processors, one or more special-purpose processors (such as digital signal processing chips, graphics acceleration processors, and/or the like), and/or other processing structure, which can be configured to perform one or more of the methods described herein, including the method illustrated in FIG. 5, by, for example, executing commands stored in a memory. The computer system 600 also can include one or more input devices 615, which can include without limitation a mouse, a keyboard, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 can also include a communications interface 630, which can include wireless and wired communication technologies. Accordingly, the communications interface can include a modem, a network card (wireless or wired), an infrared communication device, a wireless communication device, and/or a chipset (such as a Bluetooth™ device, an IEEE 602.11 device, an IEEE 602.15.4 device, a WiFi device, a WiMax device, cellular communication facilities, UWB interface, etc.), and/or the like. The communications interface 630 can therefore permit the computer system 600 to be exchanged with other devices and components of a network.

In many embodiments, the computer system 600 will further comprise a working memory 635, which can include a RAM or ROM device, as described above. Software elements, shown as being located within the working memory 635, can include an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 5, might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein. Additionally or alternatively, portions of the methods described herein may be executed through specialized hardware.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a non-volatile computer-readable medium such as a storage medium. Processors may perform the necessary tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of providing advertising data related to live media content via a data communications network, the method comprising:
   receiving, at one or more servers, a stream of data representing the live media content, wherein the stream includes a plurality of chunks of the live media content transcoded, by a media provider, for making the stream downloadable by a client device;
   receiving, at the one or more servers, an indication of a period of time in the live media content designated for advertising;
   providing, with the one or more servers, an application programming interface (API) accessible, via the data communications network, to the client device;
   determining, with the one or more servers, a time, in the live media content, at which the client device began receiving the live media content;
   sending, from the one or more servers to the client device via a communication interface, a manifest file having an indication of the period of time in the live media content during which one or more of a set of predetermined behaviors described by the API can be implemented by the client device, wherein:
      the indication of the period of time is based on the determined time at which the client device began consuming the live media content and the indication of the period of time in the live media content designated for the advertising, and
      the period of time accounts for a delay caused while transcoding the plurality of chunks;
   receiving, by the one or more servers from the client device, a request for the advertising in playback of the live media content, wherein the request leads to an index file indicating the locations of each of the plurality of chunks;
   providing, by the one or more servers to the client device, the index file to download each of the plurality of chunks to stream the live media content;
   sending, from the one or more servers to one or more advertising networks during a time of an advertising break in the live media content, the request for the advertising to fill the time of the advertising break based one or more business rules defined on a per live stream basis and the manifest file; and
   providing by the one or more servers to the client device, a response in a standardized format for the advertising in the playback of the live media content, wherein a token:
      is used in coordinating the response to the client device,
      stores an amount by which a session time of the client device is offset from real time by examining embedded timestamps in a live stream at a time a play session initiates and noting their difference from a start of a client device consumption of the live media content, and
      is utilized on subsequent requests of the play session for the client device to correctly set the session time at which the advertising break begins.

2. The method of providing advertising data related to live media content via a data communications network as recited in claim 1, wherein the set of predetermined behaviors includes at least one of:
   displaying an interstitial banner,
   displaying overlay advertisements,
   blocking fast forward controls,
   enabling interactive content, and providing tracking beacons to monitor a corresponding playback experience of a user.

3. The method for providing advertising data via the data communications network as recited in claim 1, further comprising determining the one or more advertising networks based on one or more business rules.

4. The method for providing advertising data via the data communications network as recited in claim 3 wherein the one or more business rules are determined based on a request from the client device for advertisement information.

5. The method for providing advertising data via the data communications network as recited in claim 3 further comprising:
receiving, from the one or more advertising networks, advertising information; and
sending, via the communication interface, an indication to the client device of which of the set of predetermined behaviors described by the API to implement, wherein the indication of the set of predetermined behaviors to implement is based on the advertising information.

6. The method for providing advertising data via the data communications network as recited in claim 5, wherein the indication of the predetermined behaviors to implement includes the advertising information.

7. The method of providing advertising data related to live media content via a data communications network as recited in claim 1, wherein the indication of the period of time in the live media content during which one or more of the set of predetermined behaviors described by the API can be implemented by the client device is provided in a comments portion of the manifest file.

8. A non-transitory computer-readable medium having instructions embedded thereon which, when executed by the one or more servers, cause one or more machines to perform the method recited in claim 1.

9. A server configured to provide advertising data related to live media content via a data communications network, the server comprising:
a communication interface;
a processing unit communicatively coupled with the communication interface; and
a memory communicatively coupled with the processing unit and having instructions embedded thereon which, when executed by the processing unit, cause the server to perform functions including:
receiving a stream of data representing the live media content, wherein the stream includes a plurality of chunks of the live media content transcoded, by a media provider, for making the stream downloadable by a client device;
receiving an indication of a period of time in the live media content designated for advertising;
providing an application programming interface (API) accessible, via the data communications network, to the client device;
determining, with the processing unit, a time, in the live media content, at which the client device began receiving the live media content;
sending, via the communication interface to the client device, a manifest file having an indication of the period of time in the live media content during which one or more of a set of predetermined behaviors described by the API can be implemented by the client device, wherein:
the indication of the period of time is based on the determined time at which the client device began consuming the live media content and the indication of the period of time in the live media content designated for the advertising, and
the period of time accounts for a delay caused while transcoding the plurality of chunks;
receiving, by one or more servers from the client device, a request for the advertising in playback of the live media content;
providing, by the one or more servers to the client device, the index file to download each of the plurality of chunks to stream the live media content;
sending, via the communication interface of the client device, during a time of an advertising break in the live media content, the request for the advertising to fill the time of the advertising break based on one or more business rules defined on a per live stream basis and the manifest file; and
providing by the one or more servers to the client device, a response in a standardized format for the advertising in the playback of the live media content, wherein a token:
is used in coordinating the response to the client device,
stores an amount by which a session time of the client device is offset from real time by examining embedded timestamps in a live stream at a time a play session initiates and noting their difference from a start of a client device consumption of the live media content, and
is utilized on subsequent requests of the play session for the client device to set the session time at which the advertising break begins.

10. The server configured to provide advertising data related to live media content via a data communications network as recited in claim 9, wherein the memory further includes instructions for defining the set of predetermined behaviors to include at least one of:
displaying an interstitial banner,
displaying overlay advertisements,
blocking fast forward controls,
enabling interactive content, and
providing tracking beacons to monitor a corresponding playback experience of a user.

11. The server configured to provide advertising data related to live media content via a data communications network as recited in claim 9, wherein the memory further includes instructions for determining one or more advertising networks based on the one or more business rules.

12. The server configured to provide advertising data related to live media content via a data communications network as recited in claim 11, wherein the memory further includes instructions for determining the one or more business rules based on a request from the client device for advertisement information.

13. The server configured to provide advertising data related to live media content via a data communications network as recited in claim 11, wherein the memory further includes instructions for:
receiving, from the one or more advertising networks, advertising information; and
sending, via the communication interface, an indication to the client device of which of the set of predetermined behaviors to implement described by the API to implement, wherein the indication of the predetermined behaviors to implement is based on the advertising information.

14. The server configured to provide advertising data related to live media content via a data communications network as recited in claim 13, wherein the memory further includes instructions for including, in the indication of the predetermined behaviors to implement, the advertising information.

15. A method of providing advertising data related to live media content via a data communications network, the method comprising:
   receiving a stream of data representing the live media content, wherein the stream includes a plurality of chunks of the live media content transcoded, by a media provider, for making the stream downloadable by a client device;
   receiving an indication of a period of time in the live media content designated for advertising;
   determining, with one or more servers, a time, in the live media content, at which the client device began receiving the live media content;
   sending, from the one or more servers to the client device via a communication interface, a manifest file having an indication of the period of time in the live media content during which one or more of a set of predetermined behaviors described by an application programming interface (API) can be implemented by the client device, wherein:
      the indication of the period of time is based on the determined time at which the client device began consuming the live media content and the indication of the period of time in the live media content designated for the advertising, and
      the period of time accounts for a delay caused while transcoding the plurality of chunks;
   receiving, by the one or more servers from the client device, a request for the advertising in playback of the live media content, wherein the request leads to an index file indicating the locations of each of the plurality of chunks;
   providing, by the one or more servers to the client device, the index file to download each of the plurality of chunks to stream the live media content;
   sending, from the one or more servers to one or more advertising networks during a time of an advertising break in the live media content, the request for the advertising to fill the time of the advertising break based on one or more business rules defined on a per live stream basis and the manifest file; and
   providing by the one or more servers to the client device, a response in a standardized format for the advertising in the playback of the live media content, wherein a token:
      is used in coordinating the response to the client device,
      stores an amount by which a session time of the client device is offset from real time by examining embedded timestamps in a live stream at a time a play session initiates and noting their difference from a start of a client device consumption of the live media content, and
      is utilized on subsequent requests of the play session for the client device to set the session time at which the advertising break begins.

16. The method of providing advertising data related to live media content via a data communications network as recited in claim 15, wherein the set of predetermined behaviors includes at least one of:
   displaying an interstitial banner,
   displaying overlay advertisements,
   blocking fast forward controls,
   enabling interactive content, and
   providing tracking beacons to monitor a corresponding playback experience of a user.

17. The method for providing advertising data via the data communications network as recited in claim 15, further comprising determining one or more advertising networks based on one or more business rules.

18. The method for providing advertising data via the data communications network as recited in claim 17 wherein the one or more business rules are determined based on a request from the client device for advertisement information.

19. The method for providing advertising data via the data communications network as recited in claim 17 further comprising:
   receiving, from the one or more advertising networks, advertising information; and
   including, in the manifest file, an indication of which of the set of predetermined behaviors to implement, based on the advertising information.

20. The method of providing advertising data via a data communications network as recited in claim 15, wherein the indication of the period of time in the live media content during which one or more of the set of predetermined behaviors described by the API can be implemented by the client device is provided in a comments portion of the manifest file.

* * * * *